Oct. 23, 1934.  L. J. MAZOYER  1,977,801
MOLDING APPARATUS
Filed Oct. 22, 1932  2 Sheets-Sheet 1
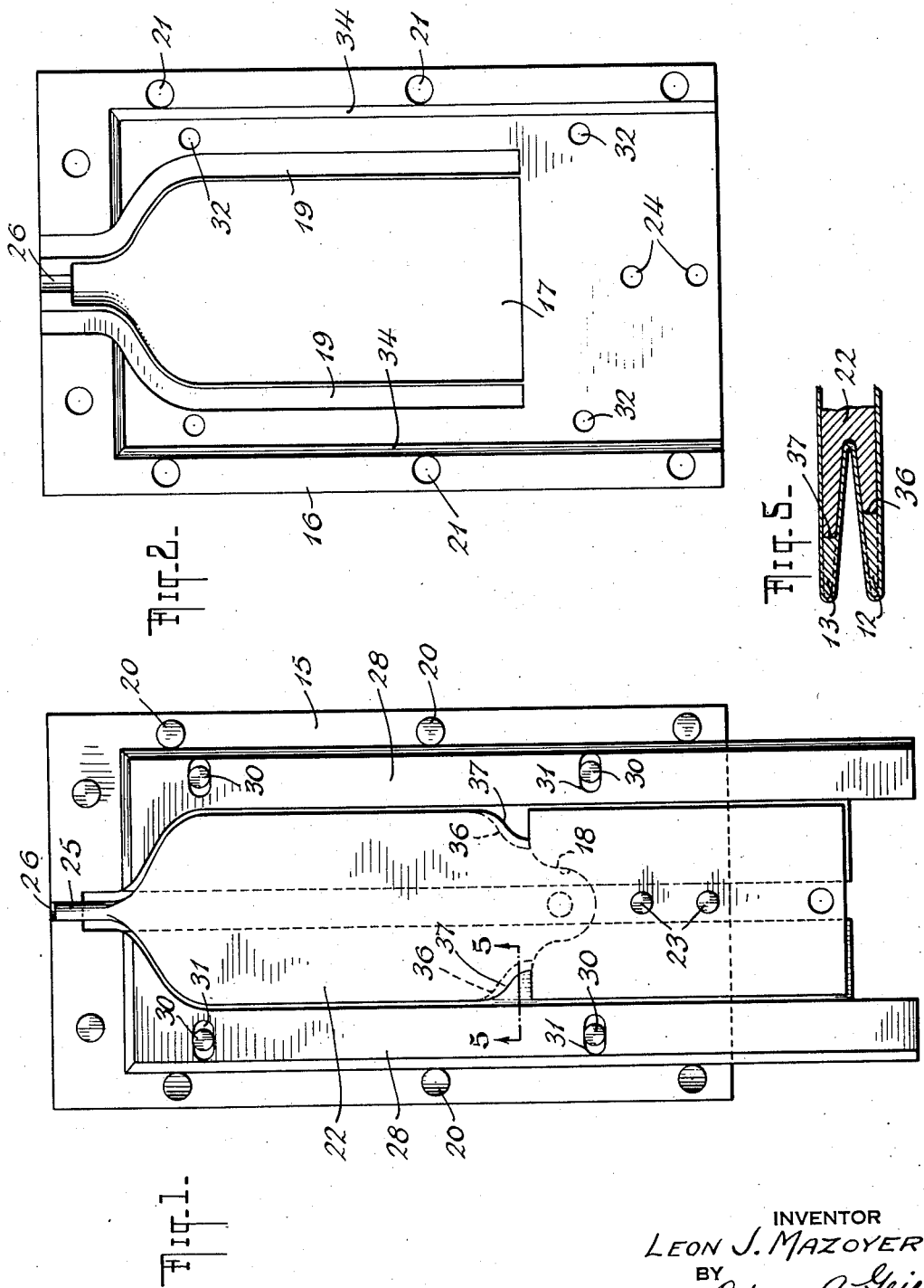
INVENTOR
LEON J. MAZOYER
BY
Oscar A. Geier
ATTORNEY Oct. 23, 1934.  L. J. MAZOYER  1,977,801
MOLDING APPARATUS
Filed Oct. 22, 1932   2 Sheets-Sheet 2
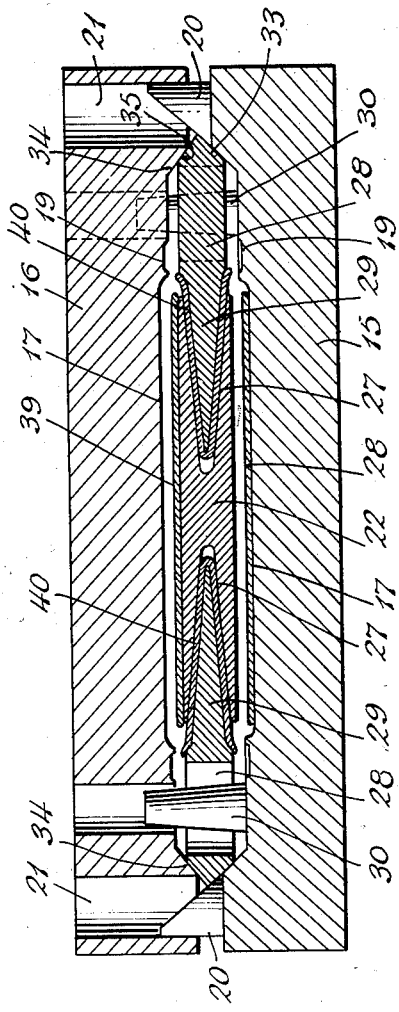
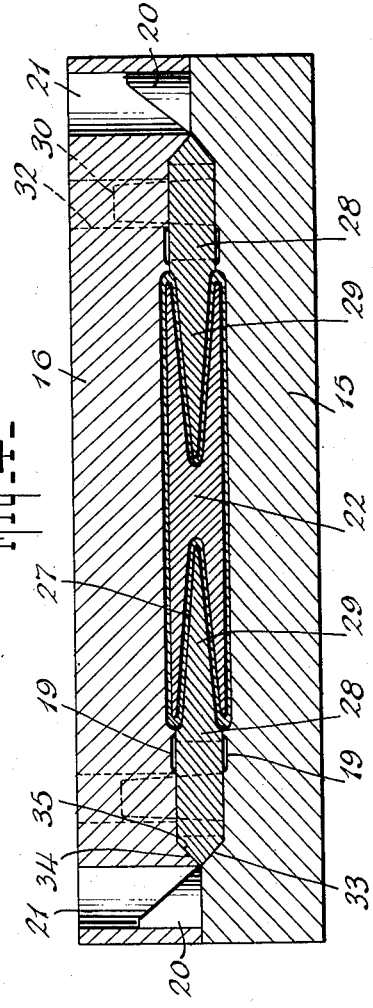
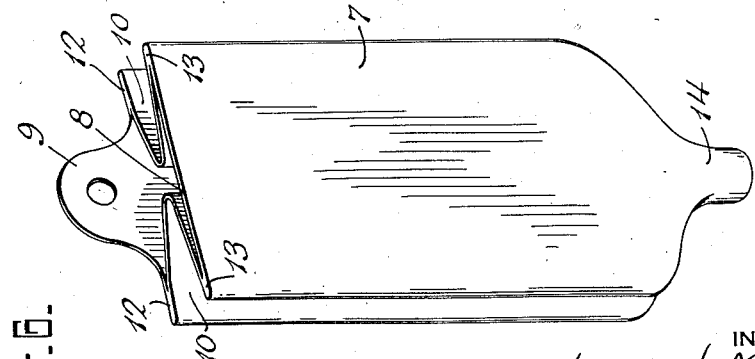
INVENTOR
LEON J. MAZOYER
BY Oscar A. Geier
ATTORNEY Patented Oct. 23, 1934

1,977,801

UNITED STATES PATENT OFFICE 1,977,801

MOLDING APPARATUS

Leon J. Mazoyer, Baldwin, N. Y., assignor to John D. Sibley, Middlefield, Conn.

Application October 22, 1932, Serial No. 639,093

2 Claims. (Cl. 18—35)

This invention relates to improvements in molding apparatus and has particular reference to a mold especially adapted for the manufacture of rubber articles such as douche bags and other like receptacles.

In the manufacture of such receptacles, it has been the common practice to make the side sections thereof each in the form of a fold which permits the receptacle to be collapsed into substantially flat condition when not in use and allows for expansion thereof so as to attain the required capacity when filling the same with a liquid. Heretofore, insofar as known, the attachment of the edges of the side sections of the receptacle to the back and front thereof has been accomplished through the medium of separate operations which have materially increased the time consumed in making the receptacle and the ultimate cost of its production.

One of the purposes of the present invention is to facilitate the manufacture of receptacles of the character contemplated by providing a mold by means of which the assembly of the front, back and folded side sections is attained simultaneously, thereby enabling the production of the receptacle at a minimum cost.

In accordance with the invention, it is contemplated to provide a mold consisting of a plurality of co-operating mold members including two face plates which, when pressure is applied thereto in one direction, will cause the application of pressure to complemental side plates toward each other and in a plane perpendicular to that which is exerted upon said face plates, to thereby effect the simultaneous assembly of the constituent parts of the receptacle.

The inventive idea involved is capable of receiving a variety of mechanical expressions, one of which, for the purposes of illustration, is shown in the accompanying drawings wherein:—

Fig. 1 is a plan view of the mold with the elements thereof, excepting the top face plate, in position.

Figure 2 is a plan view of the top face plate.

Figure 3 is a transverse section showing the parts of the mold in assembled position but prior to the application of pressure thereto.

Figure 4 is a similar view after pressure has been applied.

Figure 5 is a detailed sectional view on the line 5—5 of Figure 1 illustrating the formation of the seams which join the side sections of the receptacle to the front and back thereof, and Figure 6 is a perspective view of a receptacle, such as a douche bag, constructed in accordance with the invention.

Before proceeding with a detailed description of the molding apparatus comprising the essential features of this invention, reference is made to Figure 6 wherein there is shown a receptacle such as is made with the apparatus disclosed. The receptacle, as shown, comprises a front wall 7, a back wall 8, having a tab 9 by which the receptacle may be suspended, and said front and back walls are joined by the foldable side sections 10. At the points where the side sections 10 are joined with the rear wall 8 at the open or outer end of the receptacle, the seams 12 are wider than the seams 13 at the corners where the front wall is joined to said side sections. This increased thickness of the seams at the corners of the rear wall is provided for the purpose of additionally reinforcing the receptacle at these points, this added strengthening being required when the receptacle is filled. The bottom of the receptacle is restricted to form an outlet neck 14.

The apparatus for making the receptacle comprises the bottom and top plates 15 and 16 respectively, each of which is formed with a mold cavity 17. The two cavities in the plates are identical with the exception that in the bottom plate 15, which is utilized to mold the back wall 8 of the receptacle, is provided with the extension 18 shown in dotted lines in Figure 1, which forms the tab 9. Bordering the sides of each cavity 17 and spaced slightly therefrom are the channels 19 which are adapted to receive any overflow of the material, such as rubber, of which the receptacle is made, when the different elements constituting said receptacle are compressed between the plates 15 and 16 and heat is applied to vulcanize said elements together. The marginal edge of the plate 15 is provided with a plurality of studs 20 which are adapted to project into corresponding openings 21 formed in the edges of the plate 15 and thereby act as guides to properly position the two plates in co-operative relationship when pressure is applied to bring the plates together during the molding process.

A central core plate 22 is mounted between the plates 15 and 16 and is of a greater length than the latter plates, so that one end thereof, as shown in Figure 1, will extend beyond the ends of the latter plates to facilitate handling of the core plate. This latter plate is also provided with projecting studs 23 designed to engage in openings 24 in the plate 16 so as to properly center the core plate in position, this positioning of said plate being also facilitated by the reduced extension 25 at one end thereof which engages in a groove 26 formed in each of the plates 15 and 16. Along the opposed longitudinal edges of the core plate 22 the same is provided with inwardly tapered recesses 27 into each of which is movable a side plate 28, the inner longitudinal portion 29 of which is correspondingly tapered. These side plates 28 are substantially co-extensive with the plate 22 and have their outer ends projecting beyond the ends of the plates 15 and 16 so as to facilitate their handling.

At suitable intervals, the bottom plate 15 is provided with upstanding studs 30 which project through slots 31 formed in the side plates 28 and into openings 32 in the top plate 16, the slots 31 permitting of lateral movement of the side plates 28 relative to the plate 22.

In accordance with the invention, the pressure which is applied for instance to the top plate 16 in order to move the same toward the plate 15 during the molding process, is utilized to move the side plates 28 laterally with respect to the core plate and into the recesses 27, said movement being in a direction perpendicular to the movement of the two plates 15 and 16 toward each other. A preferred method in producing this movement of the side plates consists in inclining the free ends of the studs 20 inwardly, as shown in Figures 3 and 4 and correspondingly beveling the outer edge of each of the side plates 28 as indicated at 33, this beveled edge having a bearing upon the studs 20 so that as pressure is applied to the plates 28 by the downward movement of the top plate 16 the interengaging inclined surfaces will force said plates 28 inwardly relative to the core plate 22. To assist in maintaining the plates 28 in a horizontal position relative to the core plate, the under face of the plate 16 is beveled as indicated at 34 just inwardly of the openings 21 and these beveled edges engage with similarly formed edges 35 extending along the upper surfaces of the longitudinal outer edges of the plates 28.

In order to form the wide seams 12 between the side sections 10 and the rear wall 8, the core plate 22 is provided at opposed points and on the bottom thereof with the cut-out portions or notches 36 and on its upper surface similar but smaller notches 37 are formed directly above the notches 36 to provide the narrower corner seams 13 at the outer or open end of the receptacle. These notches permit of the flow of the material from which the receptacle is made into the same during the molding and vulcanizing process and the difference in the thickness of the corner seams 12 and 13 is clearly indicated in Figure 5.

In practice, when assembling the apparatus preparatory to a molding operation, a sheet of material 38 which is to form the back wall 8 of the receptacle is first laid in the cavity 17 of the bottom plate 15 and the core plate 22 then properly laid in position and centered upon said bottom plate in suspended relation to said sheet. A second sheet 39 which subsequently constitutes the front wall 7 of the receptacle is then laid upon the upper surface of the core plate 22. Each of the side plates 28 now has placed over its inner tapered portion 29 a strip or sheet 40 which will comprise one of the side sections 10 of the molded receptacle and said plates 28 are then mounted in position with the studs 30 projecting through the slots 31 thereof and with the portions 29 extending into the recesses 27 of the core plate, the sheets 40 being then loosely held in position by engagement with the walls of the recesses. Finally the top plate 16 is mounted in position with the studs 20 projecting into the openings 21 therein and the apparatus is now ready for the application of heat and pressure which may be accomplished in any desired manner. As the plates 15 and 16 are moved toward each other, under pressure, the inclined surfaces 20, 33 and 34, 35 co-operate to force the tapered portions 29 of the side plates 28 into the recesses 27 and at the same time pressure is brought thereupon by the sheets 38 and 39 with the result that the edges of said sheets are fused to the outer edge portions of the sheets 40 to simultaneously join said sheets and thereby complete the molded receptacle.

What is claimed is:

1. Molding apparatus for collapsible rubber bags, each of said bags being formed of two flat rubber sheets to form the front and back sides thereof, and inwardly pointed V-shaped fold members inserted between said flat rubber sheets and substantially integrally connected thereto at the outside edges thereof, said apparatus comprising cooperating mold members one of which has a movement toward the other and a central core plate positioned between said members to receive and separate said flat rubber sheets, one of the sheets being positioned between each mold member and the central plate, and the side edges of said core plate having V-shaped grooves to receive said side folds, and side wedge-shaped plates cooperating with said core plate, means to move said wedge-shaped plates laterally into said grooves upon movement of the first-named mold member to position the side folds between said front and back sheets and to cause an integral connection between side folds and the front and back sheets, said side plates being provided with transverse slot openings and one of said mold members being provided with pins to fit in said transverse openings, the sides of said pins closely fitting the sides of said slots and permitting lateral movement thereof, but preventing longitudinal movement thereof.

2. The apparatus of claim 1 in which said means to move said wedge-shaped plates includes interengaging bevelled surfaces on said mold members and said wedge-shaped plates.

LEON J. MAZOYER.